3,393,156
PELLETED ZEOLITE COMPOSITIONS
Rowland C. Hansford, Yorba Linda, Calif., assignor to Union Oil Company of California, Los Angeles, Calif., a corporation of California
No Drawing. Continuation-in-part of application Ser. No. 339,897, Jan. 24, 1964, now Patent No. 3,267,022, dated Aug. 16, 1966. This application Sept. 20, 1965, Ser. No. 488,730
8 Claims. (Cl. 252—455)

ABSTRACT OF THE DISCLOSURE

This application is a continuation-in-part of application Ser. No. 339,897, filed Jan. 24, 1964, now U.S. Patent No. 3,267,022, which in turn is a continuation-in-part of application Ser. No. 150,129, filed Nov. 6, 1961, now abandoned, which in turn is a continuation-in-part of application Ser. No. 72,325, filed Nov. 29, 1960, and now abandoned.

This invention relates to new, mechanically stable, pelleted adsorbent and/or catalyst compositions comprising crystalline, alumino-silicate zeolites of the molecular sieve type. More particularly, the invention is directed to novel copelleted composites of crystalline zeolites with a uniquely effective type of binding agent comprising an alumina-silica cogel wherein silica is the minor component. This specific type of binder has been found to give stronger and more stable pellets than other conventional binders such as alumina, silica, or silica-alumina cogels wherein silica is the major component. The invention is particularly concerned with catalysts based on type Y molecular sieve, which, by virtue of their high silica/alumina ratio, high surface area, and relatively uniform pore diameters, are particularly useful as catalysts in cracking, hydrocracking, and isomerization processes.

These novel adsorbents and/or catalysts are generally prepared by slurrying the zeolite crystals and the alumina-silica cogel in water, then removing excess water, pelleting the mixture and calcining the resulting pellets. Alternatively, the pellets may be formed by grinding or milling the sensibly dry powders together (though some water must be present in order to form stable pellets), then pelleting and calcining. It has been found also that for maximum mechanical strength and stability, the aqueous phase of the zeolite cogel mixture should be maintained prior to pelleting at relatively low pH's, below about 9.0 and preferably below 8.

In the past, pelleted catalysts and adsorbents have been prepared by mixing zeolites with binders such as activated alumina, clays and the like. It has been found however that such pelleted compositions are deficient in crushing strength and mechanical stability. The novel compositions of this invention are found to exhibit excellent mechanical strength, and moreover this strength is substantially retained through long periods of use and severe reactivation treatments, in sharp distinction to previously known zeolite pellets.

Modern catalytic processes, notably petroleum refining and conversion processes, require pelleted catalysts in the size range of about $\frac{1}{16}$-inch to $\frac{1}{2}$-inch in diameter, which are not only specifically active in the chemical reactions involved, but also possess physical characteristics required for successful operation. Of outstanding importance are bulk density, hardness or crushing strength, and resistance to attrition. The ability of a catalyst pellet to retain its shape and size notwithstanding the mechanical handling to which it is subjected in shipment, the loading and unloading of reactors, and use therein, is an important requirement for a successful catalyst. Any substantial crumbling or breaking of catalyst during loading of reactors, or crushing brought about by the mere weight of the catalyst bed, can cause serious difficulties. Firstly, the presence of unevenly distributed fine particles in the catalyst bed can cause channeling of fluid reactants traveling through the reactor, resulting in uneven contacting and conversion, and the development of "hot spots" in localized zones. These "hot spots" can be disastrous in exothermic processes such as hydrocracking, both from the standpoint of catalyst deactivation, and the development of uncontrollable runaways. Even where the fine particles are evenly distributed through the catalyst bed, other difficulties develop related to the pressure drop required to force the reactants through the reactor. It is the principal object of this invention to avoid the foregoing difficulties.

It has long been known that, due to the crystalline nature of the zeolites employed herein, it is difficult to compress the crystals into pellets having adequate mechanical strength and stability. Some of the conventional binders which have been employed such as alumina or clays do give adequate initial mechanical strength (crushing strength), but the factor of "mechanical stability" is still deficient. "Mechanical stability" refers to the ability of the pelleted composition to retain an adequate degree of crushing strength after it has been subjected to conditions prevailing in adsorptive and catalytic contacting processes. Typically, in adsorptions and in catalytic processing, the pellets may alternately come in contact with liquid hydrocarbons, hot stripping gases, steam, oxidative regeneration gases and their acidic by-products. In addition, inadvertent process upsets sometimes lead to contacting with liquid water, or to overheating. In general, all of these factors have a strong tendency to bring about a deterioration in mechanical strength, and hence it is highly desirable to provide mechanical stability in addition to adequate initial crushing strength. The binders employed herein appear to be unique in providing a greater degree of mechanical stability, and usually of initial crushing strength, than other conventional binders.

The crystalline, siliceous zeolites for use in this invention are sometimes referred to in the art as molecular sieves, and are composed usually of silica, alumina and one or more exchangeable cations such as sodium, hydrogen, magnesium, calcium, etc. They are further characterized by crystal pores of relatively uniform diameter between about 4 and 14 A. It is preferred in a large number of catalytic processes to employ zeolites having a relatively high $SiO_2/Al_2O_3$ mole-ratio, between about 3.0 and 12, and even more preferably between about 4 and 8. Suitable zeolites found in nature include for example mordenite, stilbite, heulandite, ferrierite, dachiardite, chabazite, erionite, and faujasite. Suitable synthetic zeolites include for example those of the "A," "X," "Y" and "L" crystal types, or synthetic forms of the natural zeolites noted above, especially synthetic mordenite. The preferred zeolites are those having crystal pore diameters between about 8–12 A., wherein the average crystal size is less than about 10 microns along the major dimension. A prime example of a zeolite falling in this preferred group is the synthetic Y molecular sieve.

The naturally occurring molecular sieve zeolites are usually found in a sodium form, an alkaline earth metal form, or mixed forms. The synthetic molecular sieves normally are prepared first in the sodium form. In their sodium form, the general formula for the preferred Y molecular sieve zeolite of this invention is expressed as follows:

$$0.9 \pm 0.2\ Na_2O : Al_2O_3 : WSiO_2 : XH_2O$$

where $X=0$ to about 9, and $W=3$ to about 6.

For use as a cracking base, or in other acid-catalyzed reactions, it is preferred that most or all of the original zeolitic monovalent metals be ion exchanged out with a polyvalent metal, or with an ammonium salt followed by heating to decompose the zeolitic ammonium ions, leaving in their place hydrogen ions and/or exchange sites which have actually been decationized by further removal of water:

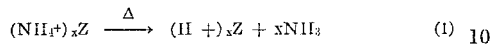  (1)

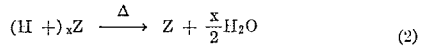  (2)

Mixed polyvalent metal-hydrogen zeolites may be prepared by ion-exchanging first with an ammonium salt, then partially back-exchanging with a polyvalent metal salt, and then calcining. In some cases, as in the case of synthetic mordenite, the hydrogen forms can be prepared by direct acid treatment of the alkali metal sieves. Hydrogen or "decationized" Y sieve zeolites of this nature are more particularly described in Belgian Patents Nos. 598,582, 598,682, 598,683, and 598,686, and U.S. Patent No. 3,130,006.

There is some uncertainty as to whether the heating of the ammonium zeolites produces a hydrogen zeolite or a truly decationized zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms are designated herein as being "metal-cation-deficient." The preferred catalyst compositions are those which at least about 10%, and preferably at least 20%, metal-cation-deficient, based on the initial ion-exchange capacity. A specifically desirable and stable class of zeolites are those wherein at least about 20% of the ion-exchange capacity is satisfied by hydrogen ions, and at least about 10% by polyvalent metal ions such as magnesium, calcium, zinc, chromium, rare earth metals, etc.

In particular, the invention is applicable to mixed zeolitic forms of the crystalline zeolites wherein, for example, most of the sodium is first replaced with ammonium ions, and then the resulting ammonium zeolite is back-exchanged with other metal salt solutions, preferably polyvalent metal salts such as magnesium, zinc, calcium or rare earth metal salts, to prepare a mixed metal-ammonium zeolite which may then be calcined to form a mixed hydrogen-polyvalent metal zeolite.

In order that the foregoing zeolites may be used as hydrocracking or isomerization catalysts, they must be activated by incorporating a minor proportion of a suitable metal hydrogenating component, normally a Group VI-B and/or Group VIII metal. The preferred hydrogenating metals comprise the Group VIII noble metals, and particularly palladium, platinum, or rhodium. Other specific promoters which may be employed include e.g., tungsten, molybdenum, chromium, manganese, etc.

The amount of hydrogenating metal in the catalyst can vary within wide ranges. Broadly speaking, any amount between about 0.1% to about 20% by weight may be used. In the case of the noble metals, it is normally preferred to use about 0.2% to 2% by weight. The preferred method of adding the hydrogenating metal is by ion exchange. This is accomplished by digesting the zeolite, preferably in its ammonium form, with an aqueous solution of a suitable compound of the desired metal wherein the metal is present in a cationic form, as described for example in Belgian Patent No. 598,686. The metal-ammonium zeolite may then be subjected to final calcining and activation in order to convert the remaining ammonium ions to hydrogen ions.

The binders employed herein are essentially coprecipitated composites of alumina and silica, wherein the silica content ranges between about 1% and 40% by weight, preferably 2% to 20%, the balance being substantially alumina. Such compositions are normally prepared by adding suitable acids such as hydrochloric acid, sulfuric acid, etc. to aqueous solutions of sodium aluminate and sodium silicate, followed by washing and drying of the resulting coprecipitated gel. The drying may be carried out by conventional "spray drying" techniques if desired, or any other method such as air drying, oven drying, etc. It is desirable however that the cogel should not be completely dried before admixing with the crystalline zeolite. It is normally preferred to retain at least about 5–50% by weight of water in the cogel, or there will be inadequate bonding forces developed during the final calcining of the copelleted composite. It is preferred also that the zeolite component should retain at least about 5 to 30% by weight of water.

The proportion of binder to be employed in the copelleted composite may vary widely, from about 3% to 95% by weight, but usually minor amounts from about 10% to 40% are employed. The optimum proportion to be employed in connection with any particular zeolite will be determined by the nature of the zeolite and the intended use. Normally, at least about 5 to 10% of binder is required for adequate mechanical stability, while the upper limit is generally dictated by the point at which an undesirable dilution of the active zeolite component occurs.

Any conventional method may be used for compositing the zeolite and binder components. The usual procedure is to slurry or mull the two components together in an excess of water until homogeneous admixture is obtained, then remove excess water as by filtration, decantation, etc., partially dry the resulting filter cake to a water content of e.g. 10–50%, grind the partially dried cake, and finally subject the resulting powder to pelleting in conventional tableting dies. The resulting pellets are then calcined by heating at e.g. about 700–1400° F. for 1 to 48 hours, in air, steam, or inert gases.

Another compounding procedure which has been used with good results involves grinding or milling the two components together in powdered form as for example in a ball mill, followed by pelleting and calcining as described above. The powders employed in this technique are sensibly dry, but should preferably contain from about 10 to 50% by weight of water.

In either of the above procedures, it is preferred that the aqueous medium in which the mixing of the two components takes place have a pH in the range below 9.0 and preferably below 8, ranging down to about 4.0. Adjustment of pH is normally obtained by adding a suitable acid such as hydrochloric acid, or a volatile base such as ammonium hydroxide. It has been observed that the mechanical stability of the resulting composites is relatively lower when the compositing is carried out at a pH above 9, while most of the zeolite components are unstable at a pH below about 4. The preferred pH range lies between about 5 and 8.

In any of the foregoing procedures, the zeolitic cation content of the zeolite component may be adjusted as desired either before or after admixture with the binder. Preferably however, all base exchange treatments are performed prior to admixture. It is further preferred, where zeolitic hydrogen ions are desired in the final composition, that the corresponding ammonium zeolite be initially mixed with the binder, and the desired hydrogen zeolite formed only on final calcining of the pelleted mixture.

Exemplary types of catalyst compositions contemplated herein include the following:

Cracking catalysts.—Mixtures of e.g. 50 to 97% by weight of X or Y molecular sieves wherein the zeolitic cations are mainly hydrogen ions and/or polyvalent metal ions, and 3 to 50% by weight of a 95% alumina–5% silica cogel binder.

Hydrocracking catalysts.—Mixtures of e.g. 50 to 97% by weight of a Y molecular sieve containing 0.2–2% by weight of palladium or platinum, wherein the zeolitic cations are mainly hydrogen ions and/or polyvalent metal ions, and 3 to 50% by weight of an alumina-silica cogel binder wherein the silica content is 3 to 15% and the alumina content between about 85 and 97% by weight.

The foregoing catalysts, and many of a similar nature, are also useful in other hydrocarbon conversions such as paraffin isomerization, alkylation, reforming of naphthas, hydrogenation of olefins and aromatic hydrocarbons, desulfurization, denitrogenation, etc.

The hydrocracking catalysts of this invention may be employed for the hydrocracking of substantially any mineral oil fraction, particularly those boiling above the conventional gasoline range, i.e., above about 300° F., and usually above about 400° F., and having an end boiling point up to about 1,000° F., but preferably not greater than about 900° F. Specific feedstocks contemplated comprise straight run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like. Specifically it is preferred to employ oils having an end boiling point between about 400° and 900° F., an API gravity between about 20° and 35°, and containing at least about 30% by volume of acid soluble components (aromatics plus olefins).

45% of the $NH_4$ ions with magnesium ion (3.6% by weight MgO), followed by the addition of 0.5 weight-percent of palladium by ion exchange, then draining and drying to a water content of about 15 weight-percent.

The foregoing zeolite catalyst powder was then employed to prepare a series of 5 different copelleted catalysts, using as the binder either spray dried alumina, or spray dried alumina/silica cogel containing 5 weight-percent $SiO_2$. In each case, the catalyst powder was slurried in an aqueous suspension of the binder at pH levels indicated in Table 1. Each of the resulting slurries was then filtered and dried to about 15–20 weight percent water. The dried filter cakes were then granulated through a 20 mesh screen, mixed with 0.5 percent graphite and compressed into ⅜-inch pellets having 8–10 pounds crushing strength before calcining. These pellets were then crushed and regranulated through a 14 mesh screen, mixed with another 0.5 weight percent graphite plus 0.5 weight percent sterotex, then repelleted and calcined in dry air at 920° F. for 10 hours.

The resulting pellets were then tested for crushing strength and mechanical stability by test procedures described in Table 1. (Crushing strengths were measured by placing an individual pellet in axially horizontal position on a flat plate and measuring the total force in pounds required to crush the same, the force being applied from above through a disc bearing on the top surface of the pellet.) The results obtained were as follows:

TABLE 1

| Catalyst No. | 1 | 2 | 3 | 4 | 5 |
|---|---|---|---|---|---|
| Bonding Agent (20 Wt. percent) | 95% $Al_2O_3$ 5% $SiO_2$ | $Al_2O_3$ | 95% $Al_2O_3$ 5% $SiO_2$ | $Al_2O_3$ | 95% $Al_2O_3$ 5% $SiO_2$ |
| pH of Slurry | 8.2 | 7.9 | 10.0 | 9.8 | 6–7 |
| Av. Crushing Strength of Calcined pellets, lbs | 34.0 | 31.9 | 37.2 | 22.9 | 21.6 |
| Stability Tests: | | | | | |
| Water Test,a Percent of Pellets: | | | | | |
| Undamaged | 96 | 4 | 92 | 28 | 100 |
| Slightly Cracked | 4 | 20 | 0 | 12 | 0 |
| Heavily Cracked | 0 | 76 | 8 | 60 | 0 |
| Kerosene Test,b Percent of Pellets: | | | | | |
| Undamaged | 32 | 0 | 12 | 0 | 44 |
| Slightly Cracked | 20 | 8 | 32 | 8 | 32 |
| Heavily Cracked | 48 | 92 | 56 | 92 | 24 | a Calcined 2 hours at 600° C. in ambient air, cooled in desiccator, immersed in water, air dried for 16 hours.
b Calcined pellets immersed in dry kerosene for 1 hour, drained on filter paper and dried for 2 days in ambient (wet) air.

Hydrocracking conditions to be employed fall within the following ranges:

HYDROCRACKING CONDITIONS

| | Operative | Preferred |
|---|---|---|
| Temperature, ° F | 400–1,000 | 450–850 |
| Pressure, p.s.i.g | 500–5,000 | 750–2,500 |
| $H_2$/oil ratio, SCF/B | 1,000–15,000 | 2,000–10,000 |
| LHSV | 0.1–20 | 0.5–10 |

Those skilled in the art will understand that the combination of conditions selected should be correlated with the particular feedstock and catalyst used, to obtain the desired conversion per pass, normally between about 20% and 70% by volume of the feed. Ordinarily, about 500 to 3,000 s.c.f. of hydrogen per barrel of gasoline produced is consumed during the hydrocracking.

The following examples are cited to illustrate more specifically certain preferred catalyst compositions of the invention, and to demonstrate their superior mechanical strength over more conventional compositions, but these examples are not to be construed as limiting the scope of the invention:

Example 1

A palladium-magnesium-hydrogen-Y-molecular sieve catalyst was prepared by first converting a sodium Y molecular sieve ($SiO_2$/$Al_2O_3$ mole ratio=4.9) to the ammonium form by ion exchange with ammonium chloride solution (90% replacement of Na ions by $NH_4$ ions), followed by a partial back-exchange with an aqueous magnesium chloride solution to replace about From the foregoing data it is apparent that at any given pH level, the alumina-silica cogel binder gave catalysts of superior mechanical stability than did pure alumina gel. It is evident also that the pH levels of 6 to 8.2 gave pellets of greater mechanical stability than was obtained at pH 10.

Although the mechanical stability tests reported above show that even with the preferred alumina-silica binder, substantial cracking of the pellets occurred, these stability tests are much more severe than would be encountered in commercial use of the catalysts. The test procedures were designed to accentuate relative differences between the catalysts, and do not necessarily indicate that these same quantitative results would be obtained in any given commercial application.

Example 2

In order to evaluate more precisely the effect on pellet stability of the alumina-silica ratio in the binder, another series of catalysts was prepared from the same zeolite catalyst component described in Example 1, copelleted with the various binders indicated in Table 2. In this case however, instead of employing the slurry-mixing technique of Example 1, the powdered zeolite component was dry mixed with the respective spray dried binder composition in a twin-shell blender. 1% of graphite powder was mixed into the dry mixed powders and the product was slugged into ⅜-inch tablets in a rotary tableting machine. The tablets were granulated through an 8 mesh screen and then sifted and ground through a 14 mesh screen. The resulting products were mixed with another 1% of graphite plus 1% of sterotex powder. These mixtures were then fed through a rotary tableting machine equipped with ⅛-inch dies and punches. The resulting pellets were calcined in dry air for 2 hours at room temperature to 480° F., 2 hours at 480° F., 1 hour at 480° to 920° F. and 1 hour at 920° F.

On testing the resulting pellets for mechanical stability, the results obtained were as follows:

TABLE 2

| Catalyst No. | Bonding Agent (20 Wt. percent) | Av. Crushing Strength of Pellets, lbs. | Stability Tests Percent of Pellets Cracked after— | |
|---|---|---|---|---|
| | | | Water Test | Kerosene Test |
| 6 | Al(OH)₃, Hydrogel | 27.5 | 70 | |
| 7 | Al₂O₃, Hydrate | | 40 | |
| 8ᵉ | {6% SiO₂, 94% Al₂O₃} | 35.5 | 0 | 85 |
| 9ᵉ | {12% SiO₂, 88% Al₂O₃} | | 0 | 95 |
| 10ᵉ | {20% SiO₂, 80% Al₂O₃} | | 0 | 100 |
| 11ᵉ | {40% SiO₂, 60% Al₂O₃} | 37.3 | 0 | 100 |
| 12ᵉ | {87% SiO₂, 13% Al₂O₃} | 40.8 | 60 | |
| 13ᵉ | SiO₂ gel, Hydrate | | 70 | |

ᵉ Spray-dried gels in all cases; about 20-30% H₂O.

The foregoing data demonstrate the same trend as shown in Table 1, namely a superior mechanical stability for the catalysts containing alumina-silica binders of 6 to 40% silica, as compared to those containing either pure alumina, pure silica, or silica-rich alumina-silica cogels.

Example 3

This example shows that zeolite catalyst pellets containing no binder are deficient in mechanical strength and stability, and also demonstrates that catalysts containing varying proportions of the preferred binders of this invention do in fact display adequate mechanical stability after use in hydrocracking.

The initial zeolite catalyst was the same palladium-magnesium-hydrogen Y sieve described in Example 1. Sereval portions of this powdered catalyst component were mixed with varying proportions of spray dried alumina containing 5 weight percent of coprecipitated silica gel. In some cases the alumina-silica gel was impregnated with 0.2-0.5% by weight of palladium. The powdered mixtures were compressed into ⅛-inch pellets, dried and calcined, and tested for activity and mechanical stability.

Activity was measured in terms of temperature required to give 55 volume-percent conversion to 400° F. endpoint gasoline after 90 hours onstream at 1000 p.s.i.g., 1.5 LHSV and 8000 s.c.f./b. of hydrogen, using a hydrofined gas oil feed having an end boiling point of about 750° F.

Pellet strength and stability were measured (before use in the activity test) by rehydrating the pellets in moist air, then determining the average crushing strength and comparing with the original crushing strength of the calcined pellets. In addition, determinations were made of the proportion of pellets which were broken or shattered during the activity test runs. The results were as follows:

TABLE 3

| Catalyst No. | 14 | 15 | 16 | 17 | 18 |
|---|---|---|---|---|---|
| Composition, Wt. Percent: | | | | | |
| Binder (95 Al₂O₃, 5 SiO₂) | 0.0 | 20 | 25 | 30 | 50 |
| Percent Pd. on Binder | 0.0 | 0.3 | 0.0 | 0.5 | 0.2 |
| Zeolite component (0.5% Pd.) | 100 | 80 | 75 | 70 | 50 |
| Activity, ° F. required for 55% Conversion | 542 | 541 | 539 | 528 | 559 |
| Crushing Strength, lbs.: | | | | | |
| After Calcining | 21.3 | 35.1 | 32.0 | 33.1 | 27.3 |
| After Rehydration | ᵃ(9.6) | 16.4 | 20.7 | 20.9 | 17.8 |
| Wt. Percent Broken Pellets After Activity Test | 2.3 | | | 0.3 | 0.0 |

ᵃ Estimated on basis of 45% strength retention found for similar catalysts after full hydration.

The superior mechanical stability of catalysts 15, 16, 17, and 18, as compared to catalyst number 14 is readily apparent, both as to initial strength and stability.

Example 4

The data in Example 3 may seem to indicate that rehydration of the calcined pellets brings about a loss in crushing strength. This is true when the rehydrated pellets are compared directly with the calcined pellets. However, recalcining of the rehydrated pellets brings about a recovery of the strength lost on hydration, and in cases where at least about 20% of binder is present, the strength of the recalcined pellets is actually superior to that of the once calcined pellets. This is demonstrated by the following data obtained on another series of catalysts prepared in general as described in Example 3.

TABLE 4

| Catalyst No | 19 | 20 | 21 | 22 | 23 |
|---|---|---|---|---|---|
| Composition, Wt. Percent: | | | | | |
| Binder (95 Al₂O₃, 5 SiO₂) | 0 | 10 | 15 | 20 | 25 |
| Percent Pd. on Binder | | 1.0 | 1.0 | 0.5 | 0.3 |
| Zeolite component (0.5% Pd.) | 100 | 90 | 85 | 80 | 75 |
| Crushing Strength, lbs.: | | | | | |
| After Calcination (920° F.) | 17.7 | 18.0 | 15.9 | 29.5 | 31.8 |
| After Full Hydration (from moist air) | 7.3 | | 10.6 | 10._ | |
| After Recalcination of Hydrated Pellets | 12.9 | 15.8 | 14.6 | 41.6 | 38.0 |
| Percent Cracked After Hydration-Recalcination | 25 | 0 | 0 | 0 | 0 |

Example 5

This example demonstrates that the preferred catalysts of Example 2, in addition to their superior mechanical stability, are also more resistant to deactivation under typical hydrocracking conditions than the catalysts containing a silica-rich binder.

Catalysts 8, 11 and 12 of Example 2 were tested for hydrocracking activity and deactivation rates, using as the feed an unconverted hydrocracking cycle oil boiling between about 400° and 850° F., containing about 9000 p.p.m. of sulfur and 1 p.p.m. of nitrogen, and having an API gravity of 39.1°. Initial hydrocracking conditions were:

Pressure, p.s.i.g. _____ 1500.
LHSV _____ 9.0.
H₂/oil ratio, m.s.c.f./b. ____ 8.0
Temp. °F. _____ As indicated in Table 5, to maintain 60 volume-percent conversion per pass to 400° F. endpoint products.

The hydrocracking temperatures are thus inversely proportional to catalyst activity. Deactivation rates were measured in terms of "AIR," i.e. the average daily temperature increase in °F. required to maintain the constant 60% conversion.

The results were as follows.

TABLE 5

| Catalyst No | 8 | 11 | 12 |
|---|---|---|---|
| Binder (20%) | {6% SiO₂, 94% Al₂O₃} | {40% SiO₂, 60% Al₂O₃} | {87% SiO₂, 13% Al₂O₃} |
| Catalyst Age, days | 11 | 11 | 11 |
| Hydrocracking Temp. °F | 702 | 747 | 741 |
| TIR, °F./day | 2.1 | 5.5 | 5.5 |

It is apparent that catalyst No. 8 not only showed a higher activity, but a deactivation rate less than half that of catalysts 11 and 12.

Following this series of tests, catalysts 8 and 12 were tested for activity and deactivation rates in hydrocracking a nitrogen-containing feed obtained by adding 2200 p.p.m. of nitrogen as tert-butylamine to the previous gas oil feed. Upon adding nitrogen to the feed, the space velocity was reduced to 1.5, and temperature then adjusted to maintain the 60% conversion per pass. The results were as follows:

TABLE 6

| Catalyst No. | 8 | 12 |
|---|---|---|
| Binder (20%) | 6% SiO$_2$ / 94% Al$_2$O$_3$ | 87% SiO$_2$ / 13% Al$_2$O$_3$ |
| Catalyst Age, days | 18 | 17 |
| Hydrocracking Temp., °F | 718 | 710 |
| TIR, °F./day | 0.1 | 0.6 |

Thus, in the presence of nitrogen, catalyst No. 12, after 17 days on-stream, appears slightly more active than catalyst No. 8, but its deactivation rate is about six times as high. Thus, after another 15–16 days onstream, the apparent activity of catalyst No. 8 will exceed that of No. 12.

Results analogous to those indicated in the foregoing examples are obtained when other crystalline zeolites described herein are substituted for those used in the examples. It is hence not intended to limit the invention to the details of the examples, but broadly as defined in the following claims.

I claim:
1. A mechanically stable adsorbent composition consisting essentially of a copelleted mixture of:
   (A) a crystalline, alumino-silicate zeolite of the molecular sieve type; and
   (B) from about 3% to about 95% by weight of a binder comprising essentially a coprecipitated alumina-silica cogel containing between about 1% and 40% by weight of SiO$_2$ and between about 60% and 99% by weight of Al$_2$O$_3$.
2. A composition as defined in claim 1 wherein said crystalline zeolite is a Y molecular sieve.
3. A composition as defined in claim 1 wherein the zeolitic cations associated with said crystalline zeolite comprise a substantial proportion of hydrogen ions.
4. A composition as defined in claim 1 wherein said alumina-silica cogel contains between about 2% and 20% by weight of SiO$_2$ and between about 80% and 98% by weight of Al$_2$O$_3$.
5. A composition as defined in claim 1 prepared by mixing said components (A) and (B) in the presence of an aqueous phase having a pH between amout 4 and 9, and pelleting and calcining the mixture.
6. A composition as defined in claim 1 wherein said component (A) is a catalytically active composite of a crystalline alumino-silicate zeolite having a SiO$_2$/Al$_2$O$_3$ mole-ratio between about 3 and 10 and containing zeolitic hydrogen ions, and deposited on said component (A) a minor proportion of a Group VIII metal hydrogenating component.
7. A composition as defined in claim 6 wherein said Group VIII metal is a noble metal.
8. A composition as defined in claim 6 wherein said Group VIII metal is palladium.

References Cited
UNITED STATES PATENTS

| 2,971,904 | 2/1961 | Gladrow et al. | 252—455 X |
| 2,983,670 | 5/1961 | Seubold | 252—455 X |
| 3,130,006 | 4/1964 | Rabo et al. | 252—455 X |
| 3,140,249 | 7/1964 | Plank et al. | 252—455 X |

DANIEL E. WYMAN, *Primary Examiner.*

MILTON WEISSMAN, EDWARD J. MEROS,
*Examiners.*

C. F. DEES, *Assistant Examiner.*